UNITED STATES PATENT OFFICE.

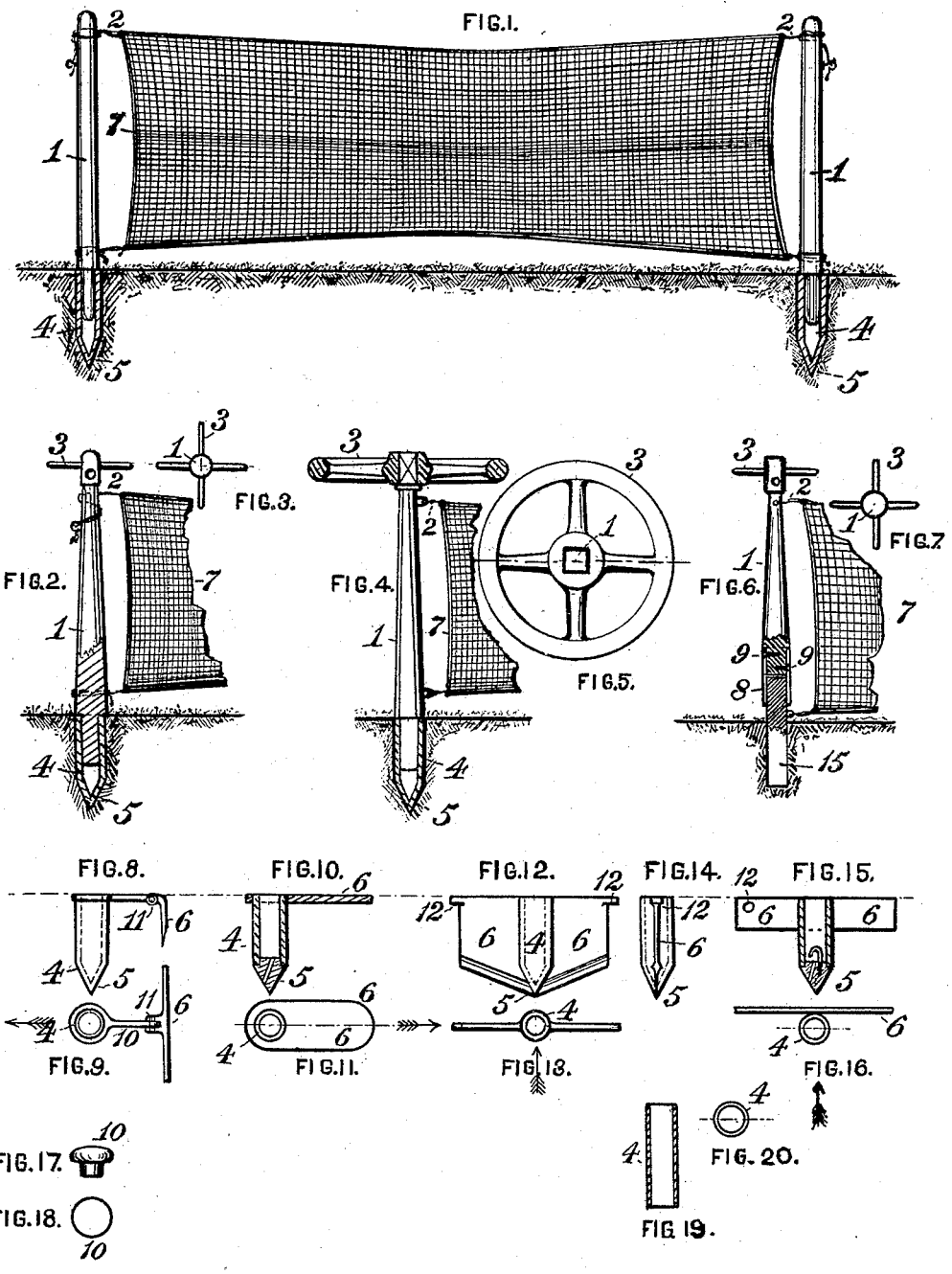

FREDERICK W. TAYLOR, OF PHILADELPHIA, PENNSYLVANIA.

SUPPORT FOR LAWN-TENNIS NETS.

SPECIFICATION forming part of Letters Patent No. 415,825, dated November 26, 1889.

Application filed August 16, 1887. Serial No. 247,047. (No model.) Patented in England September 8, 1887, No. 12,186.

*To all whom it may concern:*

Be it known that I, FREDERICK W. TAYLOR, of the city and county of Philadelphia, in the State of Pennsylvania, have invented a certain new and useful Improvement in Supports for Lawn-Tennis Nets, (for which I have obtained a patent in Great Britain, No. 12,186, bearing date September 8, 1887,) of which improvement the following is a specification.

My invention relates to means for supporting and tightening the net which is stretched across the middle of a lawn-tennis court in playing the game of lawn-tennis; and its object is to provide lawn-tennis-net supports of simple and comparatively inexpensive construction, which can be readily and quickly erected in position to support a net, or removed when it is desired to roll the court or mow the grass, without the use of guy-ropes and without the necessity of puncturing or disturbing the ground with spikes or pins, and with which the net can be easily stretched to exactly the required degree of tightness, even when a heavy net is used, without the use of windlasses, pulleys, or other mechanism heretofore employed in tightening the net and without either raising or lowering the support during the operation of tightening, while maintaining the center line of the support at the same angle with the ground during the period of its use.

The improvement claimed is hereinafter fully set forth.

In the accompanying drawings, Figure 1 is a view in elevation of two lawn-tennis-net supports embodying my invention, with a net attached thereto, the ground and post socket-pieces being shown in section; Fig. 2, a similar view of a support and portion of the attached net with a post-rotator applied; Fig. 3, a plan or top view of the same; Fig. 4, a view in elevation of a support and portion of the attached net, illustrating a different form of post-rotator; Fig. 5, a plan or top view of the same; Fig. 6, a view in elevation illustrating a modified form of support and a portion of the attached net; Fig. 7, a plan or top view of the same; Figs. 9, 11, 13, 16, and 20, plan views illustrating, respectively, different forms of post socket-pieces; Fig. 8, a view in elevation of the post socket-piece shown in Fig. 9; Fig. 10, a vertical central section through the post socket-piece shown in Fig. 11; Fig. 12, a view in elevation, and Fig. 14 an end view, of the post socket-piece shown in Fig. 13; Fig. 15, a vertical central section through the post socket-piece shown in Fig. 16; Fig. 19, a similar section through the post socket-piece shown in Fig. 20; Fig. 17, a view in elevation, and Fig. 18 a plan view, of a driving-plug for post socket-pieces.

In the practice of my invention I provide posts 1, which are preferably of circular section throughout, to which the ends of the lawn-tennis net 7 are connected by cords, tied, hooked, or otherwise suitably attached to the posts, which at their lower ends fit freely in cylindrical post socket-pieces 4, embedded in the ground, so as to be rotatable about their axes in said socket-pieces, for the purpose of stretching and bringing to desired height the interposed net 7, as may from time to time be required. The posts are detachable and removable from their socket-pieces, and their rotation may be effected either by the direct application of the hands thereto or through the intermediation of post-rotators 3, different forms of which are illustrated in the drawings, and will be hereinafter described.

To maintain the posts and socket-pieces in normal vertical position and overcome the tendency to variation therefrom induced by the strain of the net, the post socket-pieces may be provided with deflection-resisters 6, which bear in or against the ground in direction at right angles to or opposite to that in which the socket-pieces tend to move under the influence of a disturbing force.

The small arrows, Figs. 9, 11, 13, and 16, indicate the direction in which the pull of the net tends to cause the socket-piece to upset.

The socket-pieces are preferably provided with driving-points 5 at their lower ends, to facilitate their insertion in the ground, and with extractor-bearings 12, which may be either a projecting member or an opening or recess to admit of the application of a hook, bar, or lever by which they may be readily withdrawn from their positions when required. The insertion of the socket-pieces is further facilitated by the employment of a driving-plug 10, against which the driving-power may be effectively exerted, and by which it is transmitted to the top of the socket.

The post socket-pieces 4 are driven or otherwise firmly embedded in the ground, so as to be flush at top with the surface of the ground, and in each case present a cylindrical surface corresponding with and fitting against that of the lower end of the post, to admit of the rotation of the latter.

The several structural variations illustrated in the drawings are as follows:

The socket-pieces shown in Figs. 19 and 20 are formed of a plain section of pipe or tubing of any suitable material, and those of Figs. 1, 2, 4, 8, 9, 10, 11, 12, 13, 14, 15, and 16 consist of an annular tube or pipe provided at its lower end with a driving-point 5, to facilitate the insertion of the socket-piece in the ground. In Figs. 10 and 15 the driving-point is a separate casting or forging secured to the lower part of the socket-piece, while in Figs. 1, 2, 4, 8, 12, and 14 it is forged or cast or otherwise made integral with the body of the socket-piece. The small channels in the bottoms of the socket-pieces, Figs. 10 and 15, are intended to allow any water that may collect therein to drain out.

In Figs. 8, 9, 10, 11, 12, 13, 14, 15, and 16 each of the socket-pieces is shown to be provided with a deflection-resister 6. In Figs. 10 and 11 the deflection-resister is shown as consisting of a flange or plate either attached to or made part of the body of the socket-piece, and either sets on top of the ground or, by preference, is embedded in the ground, so that its top surface will not interfere with the use of a lawn-mower or a roller. This flange presents a large surface to the ground, which resists the deflection or upsetting tendency of the post when subject to the strain of the net.

The deflection-resister of Figs. 8 and 9 consists of a plate or forging 6, which is driven into the ground at a short distance from the socket-piece, and is attached thereto by the link 10, which fits around the top of the socket-piece, and is fastened to the deflection-resister 6 by a pin 11. The pivotal connection of the plate to the socket-piece facilitates the driving of the former into the ground. The deflection-resister being firmly embedded in the ground thus adds its resistance to that of the socket-piece to prevent the displacement of the socket-piece and post. In Figs. 15 and 16 the deflection-resister is shown as a plate of metal, wood, or other suitable material which is driven into the ground close to the post socket-piece, and by its pressure against the same acts to prevent its displacement or deflection. In Figs. 12, 13, and 14 the deflection-resister consists of wings or vertical flanges which are attached to or made part of the post socket-piece and assist in preventing the deflection of the socket-piece from the strain of the net. I deem preferable the deflection-resisters of the type shown in Figs. 8, 9, 12, 13, 14, 15, and 16, as in the same a broad plate is presented to the earth perpendicular to the surface of the ground, which plate offers a substantial resistance in the direction in which the post socket-piece tends to be displaced.

Figs. 12, 13, 14, and 15 show a socket-extractor bearing 12, which in Figs. 12, 13, and 14 consists of a projection from each outer end of the two deflection-resisters, under which a pry or board can be inserted in raising the socket-piece from the ground without digging up the socket-piece. In Fig. 15 a hook 16, attached to the bottom of the socket-piece, forms an extractor-bearing, under which another hook or ring can be passed, by means of which the socket-piece can be removed from the ground. By the insertion of a pry, lever, or hook into the hole 12, which is made through the deflection-resister just below the surface of the ground, the socket-piece can be removed, this hole also constituting an extractor-bearing.

The rotation of the posts to tighten the net may be effected by hand or by post-rotators 3, which are shown in Figs. 2, 3, 4, 5, 6, and 7. In Figs. 2, 3, 6, and 7 the post-rotator consists of two bars or rods, of wood or other suitable material, inserted in holes in the upper part of the post. These bars or rods may either be permanently attached to or part of the post, or they may be removable therefrom. In Figs. 4 and 5 the post-rotator consists of a wheel having a square hole in its center, which fits over a correspondingly-squared portion of the top of the post. This wheel can be removed from the post when it is not desired to allow it to remain, or may be permanently attached to the post, if preferred.

In Figs. 1, 2, and 6 the upper cord of the net 7 passes through a hole in the post, and is attached to a cleat, hook, or other convenient point of connection on the post, or may be tied around the post itself. The height of this hole above the ground is to be that required by the rules of the game. In Fig. 4 the top cord of the net 7 is attached to a hook in the post at a proper height above the ground.

The post 1 of Fig. 6 has a sleeve 8 attached to its lower part by screws 9. This sleeve fits over the top of a pin 15, which is driven or otherwise firmly embedded in the ground. The post 1, with the attached sleeve 8, is free to be rotated on the pin 15 in tightening the net, the pin acting as the equivalent of the tubular socket-pieces before described.

Fig. 17 is an elevation, and Fig. 18 a plan view, of a driving-plug 10, which fits in the top of the post socket-piece and prevents it from being broken or deformed while being driven into the ground.

In order to provide for maintaining the posts in position axially for supporting the net at the required height after the latter has been tightened to the desired degree, without the employment of ratchets, pawls, pins, polygonal collars, or other more or less complicated devices heretofore used for the purpose, I make the part of the post which fits into the socket-piece of such proportions relatively to the remainder of the post that the pull of the net against the post after the net has been tightened shall produce a sufficient degree of friction between the post and its socket-piece to prevent the post from slipping circumferentially within its socket-piece, and thereby allowing the net to unwind. A post so constructed I term a "frictionally-held post."

In order that a rotatable post shall be frictionally held in the sense in which I apply the term, it must be either so proportioned that the end portion of the post which fits in the socket-piece shall be short relatively to that which projects above the socket-piece, or that the diameter of the part of the post which fits in the socket-piece shall be large relatively to the diameter of the part of the post about which the top cord of the net is wrapped. In either case it will be seen that the unwinding power, which is the strain of the net, and the resistance, which is the friction between the lower portion of the post and the interior of the socket-piece, act through lever-arms of different lengths, the difference of leverage inducing such substantial degree of friction as prevents the rotation of the post and unwinding of the net. If the portion of the post which fits in the socket-piece be made of wood or other material whose co-efficient of friction is large, it will obviously be aided thereby in fulfilling the requirement of a frictionally-held post.

The operation of my improved supports in tightening the net is as follows: After the posts are placed in their socket-pieces and the net is attached to them they are rotated by the person who desires to tighten the net, so that either the net itself or the top cord of the net is wound around the post, thus adjusting the net to the proper height. If the net is very light and the posts are small, they can be rotated in tightening the net without the use of the post-rotator, posts of such character being shown in Fig. 1; but in most cases it becomes necessary to use some form of post-rotator, since the weight of the net and the friction of the post in its socket-piece are so great as to make it impossible to rotate the posts by seizing them with the hand and twisting them. If the part of the post which fits into the socket-piece is not made too long, and is large enough in diameter relatively to the portion of the post around which the cord is wrapped, the friction produced by the pull of the net against the socket-piece is sufficient to keep the post from untwisting in whatever position it may be placed.

I claim as my invention and desire to secure by Letters Patent—

1. The combination of a post the lower end of which is cylindrical, a socket-piece into which the lower end of the post fits closely and is rotatable therein, a lawn-tennis net connected at one end to and adapted to be wound on said post, and a second post to which the opposite end of said net is connected, substantially as described, the construction and operation being such that when the first post is rotated and the net wound thereon the strain on the upper part of said post caused by the tension of the net will, through leverage, cause the lower end of the post to bind against the socket and thereby hold it frictionally against a reverse rotary movement, as specified.

2. The combination of a rotatable post the lower end of which is cylindrical, a socket-piece adapted to closely fit the cylindrical lower end of said post and frictionally hold it against circumferential movement, a lawn-tennis net connected at one end to said post, a post to which the opposite end of the net is connected, and means for tightening the net by a rotary movement given to the first post, substantially as set forth.

FRED. W. TAYLOR.

Witnesses:
LISLE STOKES,
GEO. J. WALT.